United States Patent
Minai et al.

(10) Patent No.: US 7,066,540 B2
(45) Date of Patent: Jun. 27, 2006

(54) STRUCTURE VEHICLE SEAT WITH LIFTER

(75) Inventors: Masamitsu Minai, Akishima (JP);
Shouzou Muraishi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/998,013

(22) Filed: Nov. 29, 2004

(65) Prior Publication Data

US 2005/0121585 A1 Jun. 9, 2005

(51) Int. Cl.
*A47C 1/022* (2006.01)
(52) U.S. Cl. .......................... 297/344.15; 297/344.17; 248/421; 248/422
(58) Field of Classification Search ........... 297/344.15, 297/344.12, 344.17; 248/421, 422
See application file for complete search history.

(56) References Cited

U.S. PATENT DOCUMENTS 4,979,773 A * 12/1990 Eubank ................ 248/421 X
4,986,591 A * 1/1991 Martienssen et al. .. 297/344.15

FOREIGN PATENT DOCUMENTS

| JP | 60056642 A | * | 4/1985 |
| JP | 60148725 A | * | 8/1985 |
| JP | 2001-88589 A | | 4/2001 |
| JP | 2002-59770 A | | 2/2002 |

* cited by examiner

*Primary Examiner*—Anthony D. Barfield
(74) *Attorney, Agent, or Firm*—Browdy and Neimark, PLLC

(57) ABSTRACT

Structure of vehicle seat with lifter wherein the lifter, including lifter link elements, is operatively provided between a first element provided to vehicle seat and a second element adapted for connection with a floor of vehicle. The first and second elements are each of double wall structure having two spaced-apart walls. The lifter link elements are rotatably connected with the first and second elements by first and second pins, such that one portion of the lifter link elements is in a slidable contact with the two spaced-apart walls of first element, with the first pins passing through that one portion of lifter link elements and those two walls of first element, while another portion of the lifter link elements is in a slidable contact with the two spaced-apart walls of second element, with the second pins passing through that another portion of lifter link elements and those two walls of the second element.

10 Claims, 3 Drawing Sheets

STRUCTURE VEHICLE SEAT WITH LIFTER

BACKGROUND OF THE INVENTION

1. Field of the Invention

The present invention relates to a structure of a vehicle seat with a lifter, which includes a pair of lifter links movable so as to enable adjustment in height of the seat, and each of such lifter links comprises a forward link member movable as a driving link member and a backward link member movable as a driven link member responsive to movement of the forward link member, and also includes a mechanism for causing movement of those lifter links.

2. Description of Prior Art

A vehicle seat with a lifter is generally of the structure wherein a pair of the lifters each comprises a forward link member and a backward link member, as stated above, and wherein the seat per se is adjustably movable in the vertical direction through operation of such lifter. As disclosed for instance from the Japanese Laid-Open Publication No. 2001-88589, the seat is connected, via the forward and backward link members, with securing members fixed on a floor of vehicle, such as securing brackets or the like, so as to be supported thereon.

In this connection, in general, seat belts are provided on the vehicle seat, such that each of them may be drawn outwardly from a retractor mounted on a vehicle body in order to restrain a seat occupant to the seat. In such an emergency case as a collision, an excessive great load is applied from the seat occupant to the seat belt, and most of the load is directly escaped via the seat belt to the vehicle body. Therefore, even in the case of the above-stated seat with lifter, such excessive great load applied thereto is smoothly transmitted through the link members of the lifter to the vehicle body, without giving serious damage to the lifter.

But, there is known a vehicle seat structure wherein a seat belt is retractably mounted and not connected with the side of vehicle seat. This kind of seat is the so-called "a vehicle seat with built-in seat belt arrangement" having a retractor of the seat belt provided within the seat, which is for example disclosed from the Japanese Laid-Open Publication No. 2002-59770.

In contrast to a normal seat of the type having seat belts directly connected with the vehicle body, the vehicle seat with built-in seat belt arrangement has been with such a problem that a great load applied from a seat occupant to the seat belt is directly inputted to and exerted on the seat per se, as a result of which, support and connecting elements for supportively connecting the seat with a securing member fixed on the vehicle floor require a high strength sufficient to withstand the great load inputted from the seat belt.

On the other hand, it is possible to combine such vehicle seat with built-in seat belt arrangement with the aforementioned vehicle seat with lifter so as to provide a vehicle seat with lifter and built-in seat belt which is improved in user-friendly and easy-to-use aspects. But, considering the afore-stated excessive great load, such new type of vehicle seat requires a strength enough to withstand that great load, and in particular, the excessive great load applied from the seat belt is directly exerted upon the forward and backward link elements which will be damaged or bent. Of course, one can contemplate on increasing the thickness of securing members provided on the seat and vehicle floor as well as the thickness of the link elements of the lifter, and further increasing the diameter of connecting pins among those members and elements. However, such reinforcement result in increase of the weight of whole of seat, a corresponding increase of costs involved, and complicated structure of the seat.

SUMMARY OF THE INVENTION

In view of the above-stated drawbacks, it is a primary purpose of the present invention to provide an improved structure of vehicle seat with lifter which is of a sufficient rigidity to withstand an excessive great load applied thereto from seat belt or the like.

In order to achieve such purpose, in accordance with the present invention, there is provided a structure of vehicle seat, wherein the lifter includes: a lifter link means having one portion and another portion opposite to that one portion; and a drive means for causing rotation of the lifter link means so as to raise and lower the vehicle seat;

wherein the lifter is operatively provided between a first element provided to the vehicle seat and a second element adapted to for fixed connection with a side of a floor of vehicle, such that the lifter link means rotatably connected between the first and second elements, wherein the first element is of a double wall structure having a pair of spaced-apart walls, wherein the second element is also of a double wall structure having a pair of spaced-apart walls, and wherein the lifter link means is rotatably connected with the first and second elements by a first pin means and a second pin means in such a manner that the foregoing one portion of the lifter link means is in a slidable contact with the pair of spaced-apart walls of the first element, with the first pin means passing through the one portion of the lifter link means and the pair of spaced-apart walls of the first element, and that the foregoing another portion of the lifter link means is in a slidable contact with the pair of spaced-apart walls of the second element, with the second pin means passing through the foregoing another portion of the lifter link means and the pair of spaced-apart walls of the second element.

Preferably, the first element may be of a generally box-like structure which substantially has four enclosure walls including the pair of spaced-apart walls.

Preferably, the first element may comprise a frame member of the double wall structure having the pair of spaced-apart walls, the frame member being fixedly attached to the vehicle seat, and wherein the second element comprises a securing bracket of a generally U-shaped cross-section having the pair of spaced-apart walls, the securing bracket being adapted for fixed connection with the side of the floor of vehicle.

The drive means may include a sector gear and a connecting link member operatively connected between the gear means and the lifter link means and the sector gear and connecting link member may be movably disposed within the first element.

Other various features and advantages will become apparent from reading of the descriptions hereinafter, with reference to the annexed drawings.

DETAILED DESCRIPTION OF PREFERRED EMBODIMENT OF THE INVENTION

Figure 1:
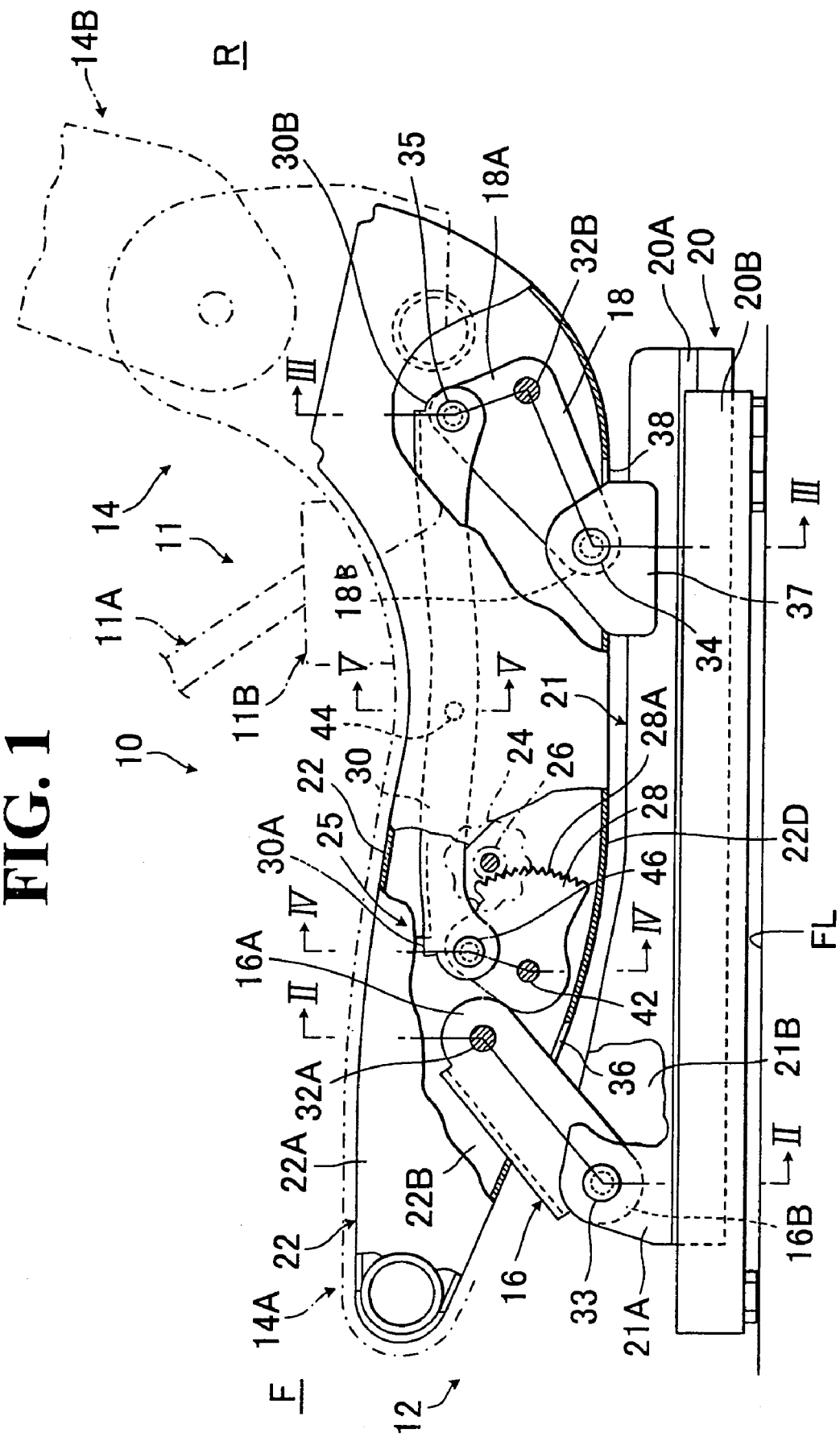
FIG. 1 is a partly broken elevational side view showing principal parts of structure of vehicle seat with lifter in accordance with the present invention.

Referring to FIGS. 1 to 5, there is illustrated one exemplary embodiment of structure of vehicle seat with lifter, as generally designated by (10), wherein the vehicle seat is designated by (14), comprising a seat cushion (14A) and a seat back (14B) as normally known in the art, and wherein the lifter is designated by (12), which is of a known lifter structure comprising a forward lifter link member (16) and a backward lifter link member (18) so as to enable adjustment in height of the seat In the present embodiment, as indicated by the one-dot chain line in FIG. 1, this vehicle seat structure with lifter (10) further includes a known built-in seat belt arrangement (11) which allows a seat belt (11A) to be drawn from and retracted into a housing (11B) in which a retractor (not shown) connected with the seat belt (11A) is provided.

In this context, it is noted that, hereinafter, the wording, "forward" or "forwardly", and the wording, "backward" or "backwardly", shall refer to a direction to the forward side (F) of seat (14) and a direction to a backward side (R) of seat (14), respectively.

Now, a description will be made of the vehicle seat structure (10) of the type provided with the lifter (12A) and seat belt arrangement (11).

In brief, the forward and backward lifer link members (16) and (18) are movably connected between a first constituent element fixed to the side of the seat cushion (14A) or a side frame (22) and a second constituent element adapted for fixed connection with a side of a vehicle floor (F) or a securing bracket (21), the details of which will be described later.

Figure 2:
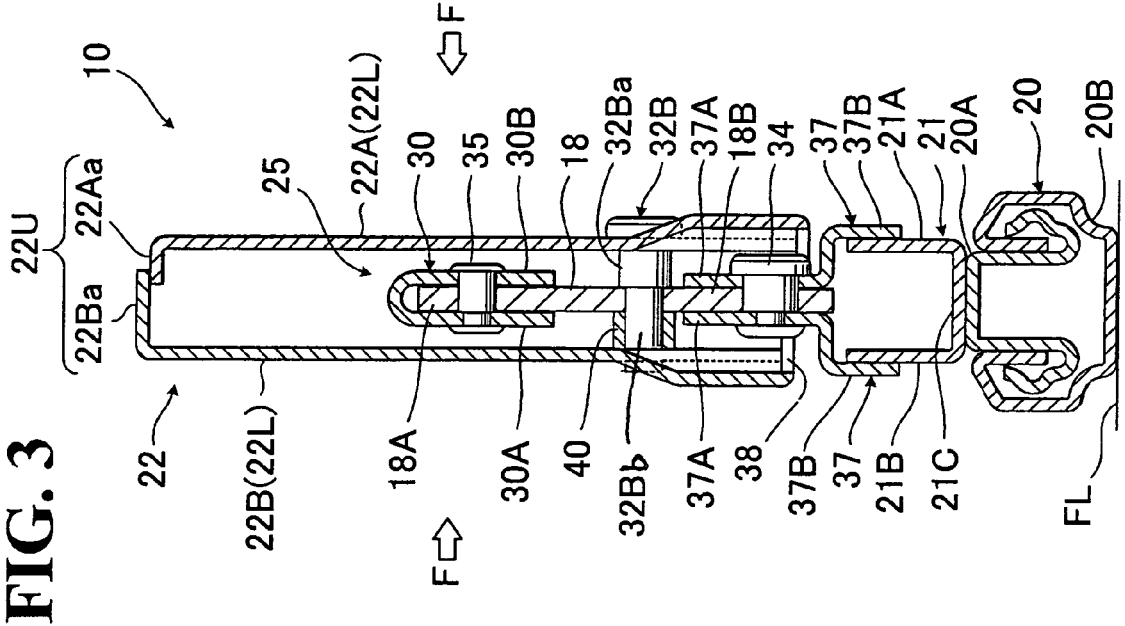
FIG. 2 is a sectional view taken along the line II—II in the FIG. 1.

In accordance with the present invention, the securing bracket (21), having a generally inverted-U-shaped cross-section formed by a bottom wall (21C) and a pair of first and second vertical walls (21A) (21B), is fixed on the upper rail (20A) of a slide rail device (20) at the bottom wall (21C) thereof, as seen in FIG. 2. Hence, the securing bracket (21) is of a double wall structure having such two vertical walls (21A) (21B). In particular, the lower end portion (16B) of the forward lifter link member (16) is disposed between the first and second vertical walls (21A) (21B) of the securing bracket (21) and pivotally connected therewith by a connecting support pin or so-called straddle pin (33) which is supported at the two ends thereof by those two respective vertical walls (21A) (21B) in such a way as to straddle the latter. For all connecting support pins of this kind which will appear hereinafter in this description, the term, "straddle pin", will be used for simplicity.

Figure 3:
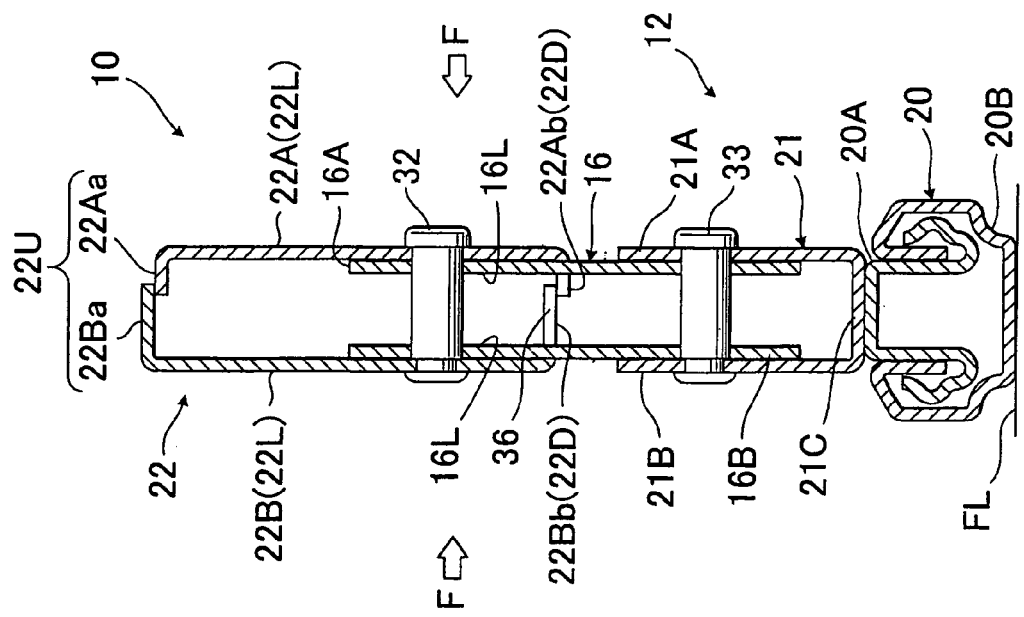
FIG. 3 is a sectional view taken along the line III—III in the FIG. 1.
Figure 4:
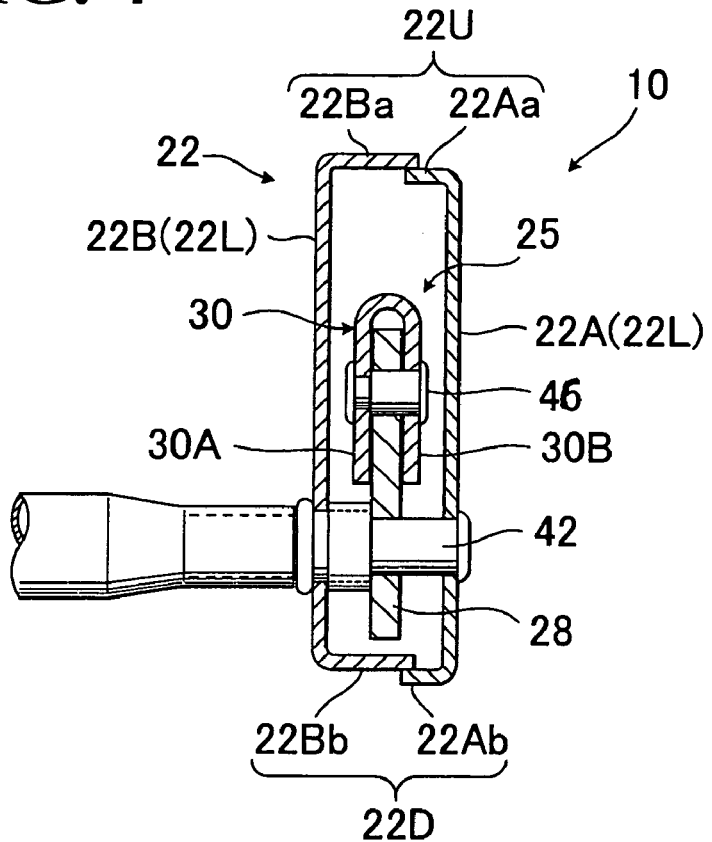
FIG. 4 is a sectional view taken along the line IV—IV in the FIG. 1.

On the other hand, in brief, the lower end (18B) of the backward lifter link member (18) is rotatably connected via a straddle pin (34) between a pair of support brackets (37) (37) fixed to the respective first and second vertical walls (21A) (21B) of securing bracket (21), as seen in FIGS. 1 and 3.

As shown in FIG. 1, the lifter (12A) has a drive mechanism (25) to cause forward and backward rotative motion of the backward lifter link member (18) as a drive link member to thereby cause simultaneous forward and backward rotative motion of the forward lifter link member (16). The drive mechanism (25) itself is known in the art and comprises an operation handle (24), a sector gear (28) having a gear portion (28A), and a connecting link member (30). The operation handle (24) has a pinion gear (26) meshed with the gear portion (28A) of the sector gear (28). The connecting link member (30) is at one end thereof pivotally connected by a pin (46) with the sector gear (28) and at another end thereof pivotally connected by a pin (35) with an upper end of the backward lifter link member (18). As shown, the connecting link member (30) extends between the forward and backward lifter link members (16) (18) in the longitudinal direction of the seat (14). With such arrangement, rotation of the operation handle (24) causes simultaneous rotation of the sector gear (28), which in turn causes forward and backward movement of the connecting link member (30), whereby the backward lifter link member (18) is rotated forwardly and backwardly relative to the pin (34) as a drive link, thereby simultaneously causing the forward lifter link member (16) to rotate forwardly and backwardly as a driven link, so that the side frame (22) or the seat (14) is raised and lowered in response thereto.

In accordance with the present invention, the illustrative mode of side frame (22) is of a double wall structure and a generally box-like configuration. Generically stated, the side frame (22) is so formed substantially as to have a pair of upper and lower horizontal walls (22U) (22D) and a pair of lateral vertical walls (22L) (22L). As illustrated, specifically stated, such box-like side frame (22) is formed by fixedly connecting the upper and lower horizontal flanges (22Ba) (22Bb) of one frame half (22B) with the respective upper and lower horizontal flanges (22Aa) (22Ab) of another frame half (22A), wherein those connected horizontal flanges (22Aa, 22Ba, 22Aa and 22Ab) form the upper and lower walls (22U) (22D) of the side frame (22), while the two frame halves (22A) (22B) form the respective lateral walls (22L) (22L). It is noted that a first through-hole (36) is defined in the lower wall (22D) of side frame (22) at a point corresponding to the forward lifter link member (16), whereas a second through-hole (38) is defined in another point of the lower wall (22D) of side frame (22) which corresponds to the backward lifter link member (18).

In this embodiment, the forward lifter link member (16) is formed in a generally U-shaped cross-section, having two spaced-apart lateral walls (16L) (16L). As seen in FIGS. 1 and 2, the forward lifter link member (16) is pivotally connected at the upper end portion (16A) thereof with the forward region of the side frame (22) via the straddle pin (32A), such that the two lateral walls (16L) thereof are in a slidable contact with the respective inner surfaces of the two lateral walls (22L) of the side frame (22). Likewise, as shown, the lower end portion (16B) of the forward lifter link member (16) is pivotally connected with the forward region of the side frame (22) via a straddle pin (33), such that two lateral walls (16L) thereof are in a slidable contact with the respective inner surfaces of the two slide frame lateral walls (22L).

As shown, the upper end portion (16A) of the forward lifter link member (16) is disposed within the box-like configuration of the side frame (22), while other remainder portion of the forward lifter link member (16) extends downwardly through the through-hole (36) and terminates in the lower end portion (16B) disposed internally of the securing member (21).

On the other hand, as far as the present embodiment is concerned, the backward lifter link member (18) is formed from a plate material, thus forming a plate lifter link member. As can be seen from FIG. 3 in conjunction FIG. 1, such plate lifter link member (18) is pivotally connected at the backward end portion (18A) thereof with the backward region of the side frame (22) via a stepped pin or stepped straddle pin (32B) having a large-diameter shank portion (32Ba) and small-diameter shank portion (32Bb). More specifically, as best shown in FIG. 3, that particular backward end portion (18A) of backward lifter link member (18) is rotatably connected about the small-diameter shank portion (32Bb) of the stepped straddle pin (32B), and also, a ringed spacer (40) is rotatably engaged about that small diameter portion (32Bb). It is seen that such backward end portion (18A) is slidably sandwiched between the stepped pin's large-diameter shank portion (32Ba) and the ringed spacer (40) and thereby retained against movement along the axial direction of the pin (32) or in the direction transversely of the side frame (22). On the other hand, the lower end portion (18B) of the backward lifter link member (18) is slidably sandwiched between the two upper end regions (37A) respectively of the two support brackets (37) while being pivotally connected therewith via the straddle pin (34).

Likewise as in the forward lifter link member (16), the upper end portion (18A) of this backward lifter link member (18) is disposed within the box-like configuration of side frame (22), while other remainder portion of the backward lifter link member (18) extends downwardly through the through-hole (38) and terminates in the lower end portion (18B) disposed internally of the two securing brackets (37).

Of course, both forward and backward lifter link members (16) (18) may be of the channel cross-section having a pair of spaced-apart walls, or formed in the foregoing plate structure, though not shown.

Figure 5:
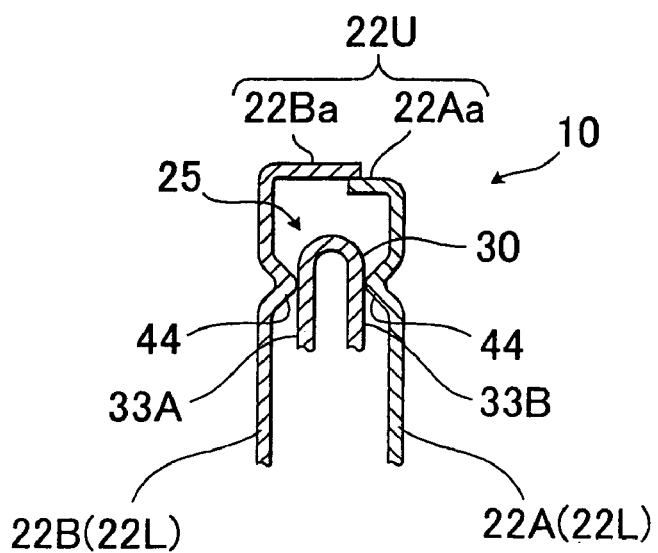
FIG. 5 is a fragmentary sectional view taken along the line V—V in the FIG. 1.

Designations (44) (44) denote a pair of inwardly projected portions which are formed in the respective vertical wall portions (22L) of the side frame (22) in such a manner as to correspond to a locus along which the connecting link member (30) is to be moved by operation of the drive mechanism (25). As best shown in FIG. 5, the two lateral vertical wall portions (30A) (30B) of the connecting link member (30) are in a slidable contact with the foregoing two inward projected portions. In place of such projection portions (44), any other suitable supportive guide means, such as circular bosses or beads, may be used. This simplified arrangement insures to supportively guide the connecting link member (30) in the longitudinal direction of the seat, thereby materializing a smooth and stable transmission of drive force to the backward lifter link member (18).

Accordingly, in accordance with the present invention, it is appreciated that the following effects and advantages are attained:

(i) The side frame (22) is of a double wall structure which is defined by the two vertical side walls (22L) (22L), and also, the securing bracket (21) is of a double wall structure defined by the two vertical walls (21A) (21B). This double wall structure is sufficient to withstand a lateral excessive great force (F) applied thereto from the seat belt (11A), thereby preventing both of the side frame (22) and securing bracket (21) against bending and breakage.

(ii) Further, the forward lifter link member (16) is of a double wall structure defined by the two vertical walls (16L) (16L), which is sufficient to withstand the lateral excessive great force (F) applied thereto. Also, in addition thereto, the two lateral walls (16L) of that forward lifter link member (16) are in a slidable contact with the respective two lateral walls (22L) of the side frame (22) as well as with the respective two lateral walls (21A) (21B) of the securing bracket (21), which is effective in dispersing or distributing most of the great force (F) to both of the side frame (22) and securing bracket, thereby preventing an intensive exertion of the force (F) upon the forward lifter link member (16). Hence, the forward lifter link member (16) is protected against bending or breakage by that excessive great load (F). In this connection, as previously described, with regard to the backward lifter link member (18) formed from plate material, the two sides of the lower portion thereof (18B) may be slidably contacted with the respective upper regions (37A) of two connecting brackets (37), while the two sides of the upper portion thereof (18A) may be slidably contacted with the large-diameter shank portion (32B) of pin (32) and ringed spacer (40), respectively, With this arrangement, the link member (18) can withstand the lateral excessive great force (F) applied thereto and is prevented against bending and breakage , and also, most of the great force (F) is dispersed to both of the side frame (22) and connecting brackets (37), thereby preventing an intensive exertion of the force (F) upon the backward lifter link member (18).

(iii) The generally box-like structure of the side frame (2), which substantially has four enclosure walls, provides a high strength to withstand an excessive great load applied thereto and is also effective in reducing the weight of the seat.

(vi) By virtue of the double-wall structural features discussed in the points (i) and (ii) above, the thickness of juxtaposed vertical walls (22A and 16L or 22B and 16L) is of such a dimension as to increase a support area for supporting the two ends of each straddle pin (32A or 33), thereby serving to prevent deformation of a hole in that support area through which the pin passes due to an excessive great force (F) exerted on that particular pin and also serving to preventing the pin itself against bending and breakage. In the case of the backward lifter link member (18) formed from plate material, a whole shank portion of the pin (32B) is surrounded and reinforced by the following three elements: the large-diameter portion (32Ba) of that pin (32B) per se; the backward lifter. link member (18); and the ringed spacer (40), whereas a whole shank portion of the pin (34) is also surrounded and reinforced by the following three elements: the two upper portions (37A) of support bracket (37) and the backward lifter link member (18). Hence, both two pins (32B) (34) are protected against bending and breakage.

(v) By virtue of the structural features stated in the points (i) to (vi) above, there is no need for increasing the thickness of elements fixed on the floor (FL), such as the securing brackets (21) and slide rail device (20), and no need for increasing the diameter of shank portion of each pin (32A, 33, 32B and 34), neither, thereby not only avoiding increase of weight of a whole of seat and costs involved therein, but also avoiding provision of any other separate reinforcing element as well as any complicated structure of seat and lifter.

(vi) A whole of the drive mechanism (25) associated with the lifter (12), such as the pinion and sector gears (26) (28) and the connecting link member (30), is disposed within the side frame (2). This advantageously prevents contact of the drive mechanism (25) with a part of seat occupant's body and also improves an aesthetic outer appearance of the seat (14). In particular, as can be seen in FIG. 1, a substantive part of the forward lifter link member (16) is disposed within both side frame (22) and securing bracket (21) and therefore not exposed to the outside, while on the other hand, a whole of the backward lifter link member (18) is disposed and hidden within the side frame (22).

While having described the present invention so far, it should be understood that the invention is not limited to the illustrated embodiment, but other modification, replacement, and addition can be applied thereto without departing from the scopes of the appended claims. For example, the side frame 22 may be of a generally inverted-U-shaped cross-section, instead of the box-like configuration.

What is claimed is:

1. A structure of vehicle seat with a lifter,
wherein said lifter includes: a lifter link means having one portion and another portion opposite to said one portion; and a drive means for causing rotation of said lifter link means so as to raise and lower said vehicle seat;
wherein said lifter is operatively provided between a first element provided to said vehicle seat and a second element adapted for fixed connection with a side of a floor of vehicle, such that said lifter link means of the lifter is rotatably connected between said first and second elements;
wherein said first element is of a double wall structure having a pair of spaced-apart walls;
wherein said second element is also of a double wall structure having a pair of spaced-apart walls,
wherein said drive means is provided within said first element so as to be movably disposed between said pair of spaced-apart walls of the first element, and
wherein said lifter link means is rotatably connected with said first and second elements by a first pin means and a second pin means in such a manner that said one portion of said lifter link means is in a slidable contact with said pair of spaced-apart walls of said first element, with said first pin means passing through said one portion of said lifter link means and said pair of spaced-apart walls of the first element, and that said another portion of said lifter link means is in a slidable contact with said pair of spaced-apart walls of said second element, with said second pin means passing through said another portion of said lifter link means and said pair of spaced-apart walls of the second element.

2. The structure of vehicle seat with lifter as claimed in claim 1, wherein said first element is of a generally box-like structure which substantially has four enclosure walls including said pair of spaced-apart walls.

3. The structure of vehicle seat with lifter as claimed in claim 1, wherein said vehicle seat includes a seat belt means provided therewith.

4. The structure of vehicle seat with lifter as claimed in claim 1, wherein said first element comprises a frame member of said double wall structure having said pair of spaced-apart walls, said frame member being fixedly attached to said vehicle seat, and wherein said second element comprises a securing bracket of a generally U-shaped cross-section having said pair of spaced-apart walls, said securing bracket being adapted for fixed connection with said side of said floor of vehicle.

5. The structure of vehicle seat with lifter as claimed in claim 4, wherein said frame member is of a generally box-like structure which substantially has four enclosure walls including said pair of spaced-apart walls.

6. The structure of vehicle seat with lifter as claimed in claim 1, wherein said drive means includes a sector gear and a connecting link member operatively connected between said gear means and said lifter link means; and wherein said sector gear and connecting link member are movably disposed between said pair of spaced-apart walls of said first element.

7. The structure of vehicle seat with lifter as claimed in claim 1, wherein said drive means includes a sector gear and a connecting link member operatively connected between said sector gear and said lifter link means; said connecting link member having two lateral sides, wherein said sector gear and connecting link member are movably disposed between said pair of spaced-apart walls of said first element, and wherein said first element has a pair of projection formed in the respective said pair of spaced-apart walls thereof, said pair of projection being adapted for slidable contact with the respective said two lateral sides of said connecting link member.

8. The structure of vehicle seat with lifter as claimed in claim 1, wherein said lifter link means is of a generally channel cross-section having a pair of spaced-apart walls, and wherein said pair of spaced-apart walls of said lifter link means are in a slidably contact with the respective said pair of spaced-apart walls respectively associated with said first and second elements.

9. The structure of vehicle seat with lifter as claimed in claim 1, wherein said lifter link means comprises at least one plate lifter link member having two lateral sides, one portion corresponding to said one portion of said lifter link means, wherein said one portion of said at least one plate lifter link member is disposed within said first element, wherein said first pin has a large-diameter portion and a small-diameter portion, wherein a spacer means is provided, wherein, within said first element, said first pin passes through said one portion of said at least one plate lifter link member, with said large-diameter portion thereof being in a slidable contact with one of said two lateral sides of said at least one plate lifter link member, while said spacer means is engaged about said small-diameter portion of said first pin and in a slidable contact with another of said two lateral sides of the at least one plate lifter link member, wherein said second element includes a means for defining an additional pair of spaced-apart walls adapted for slidable contact with the respective said two lateral sides of said at least one plate lifter link member, and wherein said second pin passes through said another portion of said at least one plate lifter link member and said additional pair of spaced-apart walls.

10. The structure of vehicle seat with lifter as claimed in claim 1, wherein said lifter link means comprises a first link member having one and another portion, and a second link member having one portion and another portions opposite to said one portion,
wherein said drive means is operable for causing rotation of one of said first and second link members,
wherein said first and second link members are rotatably connected between said first and second elements,
wherein said first pin means comprises a pair of first pins, and said second pin emans comprises a pair of second pins,
wherein said one portion of said first link member is rotatably connected with said first element by one of said pair of first pins, while said another portion of the first link member is rotatably connected with said second element by another of said pair of first pins, in such a manner that said one end portion of said first link member is in a slidable contact with said pair of spaced-apart walls of said first element, while said another end portion of said first link member is in a slidable contact with said pair of spaced-apart walls of said second element, and wherein said one portion of said second link member is rotatably connected with said first element by one of said pair of second pins, while said another portion of the second link member is rotatably connected with said second element by another of said pair of said second pins, in such a manner that said one end portion of said second link member is in a slidable contact with said pair of spaced-apart walls of said first element, while said another end portion of said second link member is in a slidable contact with said pair of spaced-apart walls of said second element.

* * * * *